(12) United States Patent
Suzuki et al.

(10) Patent No.: US 6,646,710 B2
(45) Date of Patent: Nov. 11, 2003

(54) LIGHT MODULATOR

(75) Inventors: Teiichi Suzuki, Nakai-machi (JP); Takehito Hikichi, Nakai-machi (JP); Shigeru Yamamoto, Nakai-machi (JP); Naoki Hiji, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1 day.

(21) Appl. No.: 09/842,252

(22) Filed: Apr. 26, 2001

(65) Prior Publication Data

US 2001/0035932 A1 Nov. 1, 2001

(30) Foreign Application Priority Data

Apr. 27, 2000 (JP) ........................................ 2000-127561

(51) Int. Cl.$^7$ .............................................. G02F 1/1336
(52) U.S. Cl. ....................................... 349/172; 349/115
(58) Field of Search ................................ 349/113, 172, 349/175

(56) References Cited

U.S. PATENT DOCUMENTS

| | | | | |
|---|---|---|---|---|
| 4,852,978 | A | * | 8/1989 | Davey et al. ................ 350/350 |
| 5,301,045 | A | * | 4/1994 | Miller et al. .................. 359/37 |
| 5,325,218 | A | * | 6/1994 | Willett et al. .................. 349/74 |
| 5,359,439 | A | * | 10/1994 | Miller et al. ................... 359/76 |
| 6,130,732 | A | * | 10/2000 | Crawford et al. ............. 349/86 |
| 6,133,971 | A | * | 10/2000 | Silverstein et al. ............ 349/86 |
| 6,245,256 | B1 | * | 6/2001 | Wu et al. ................. 252/299.6 |
| 6,278,505 | B1 | * | 8/2001 | Okada et al. .................. 349/78 |
| 6,317,189 | B1 | * | 11/2001 | Yuan et al. ................... 349/176 |

FOREIGN PATENT DOCUMENTS

JP    5-241527 A    9/1993

OTHER PUBLICATIONS

P. Patel et al, "Bistable Switching in Polymer–Dispersed Ferroelectric Smectic–C* Displays", SID 94 Digest, pp. 845–847.
A. V. Parfenov et al., "Transverse Electro–Optical Effects in Ferroelectric SmC* Liquid Crystals for Gray–Scale Spatial Light Modulators", SID 94 Digest, pp. 237–240.
D. K. Yang et al., "Switching Mechanism of Bistable Reflective Cholesteric Displays", SID 95 Digest, pp. 351–354.

* cited by examiner

*Primary Examiner*—James Dudek
(74) *Attorney, Agent, or Firm*—Oliff & Berridge, PLC (57) ABSTRACT

A bright, and contrasty reflective display can be performed without using polarizer films, and display switching can be performed fast. A ferroelectric liquid crystal is sandwiched between substrates, and electrodes are formed face to face with each other in a direction parallel to the substrates. The ferroelectric liquid crystal, when no electric field is applied to it, goes into a planer state in which a helical axis becomes perpendicular to or almost perpendicular to the substrates, selectively reflecting light of specific wavelengths in a visible region. A driving circuit applies an electric field between the electrodes in a direction perpendicular to or almost perpendicular to the helical axis of the ferroelectric liquid crystal in the planer state. When an electric field equal to or greater than a threshold value is applied, the ferroelectric liquid crystal changes from a planer state due to a low electric field to a homeotropic state in which a helical structure disappears, going into a transparent state, wherein, in the homeotropic state, a cyclic change of refractive index disappears and liquid crystal molecules are arranged in the direction of the electric field. The change in this case is performed fast because the ferroelectric liquid crystal has spontaneous polarization. The ferroelectric liquid crystal may be filled between a pair of transparent substrates each having a transparent electrode formed thereon to apply electric fields in a direction parallel to or almost parallel to the helical axes.

10 Claims, 7 Drawing Sheets

LIGHT MODULATOR

BACKGROUND OF THE INVENTION

1. Field of the Invention

The present invention relates to a light modulator such as a display device and an optical switch that employ liquid crystals.

2. Description of the Prior Art

Thanks to the technical development, the TN-type TFT liquid crystal displays offer high displaying quality. A color reproduction range has been improved to such a level as to be near to that of CRT, and the contrast ratio comparable to or better than that of CRT has also been achieved. The problem of viewing angles of liquid crystals has been solved by the invention of the inplane switching system or the vertical alignment system, resulting that display devices with wide viewing angles and high image quality have come into existence.

However, there still exist some problems. Since these display devices use backlight, they consume a lot of power and in bright places such as the outdoors, images on the screen is difficult to see because of ambient light brighter than the brightness of the screen.

For these reasons, reflective display devices, which make use of the ambient light for illumination, are in the limelight. Since the reflective display devices consume less power and provide clear images in brighter places, they are suitable for display devices of mobile computers and portable phone terminals which are used outsides.

As reflective display devices, liquid crystal display devices using TN system and ECB system are known. However, since these use polarizer films which absorb more than one-half of outside light is absorbed, there are the problems of a low refrectance and a difficulty in displaying white.

On the other hand, as a system not using polarizer films, the PCGH (phase change guest host) system is known. According to the PCGH system, with dichroic dyes added to cholesteric liquid crystals, when no electric field is applied, specific colors are displayed by aligning liquid crystal molecules and the dichroic dyes in a direction parallel to the substrates due to a planer state of the cholesteric liquid crystals; when an electric field is applied, cholesteric liquid crystal layers are made transparent by arranging the liquid crystal molecules and the dichroic dyes in a direction perpendicular to the substrates. However, the PCGH has a problem that a high contrast cannot be obtained because it is difficult to obtain a dye with a high dichroism ratio.

Accordingly, as reflective liquid crystal display devices without polarizer films, display devices using selective reflection of cholesteric liquid crystals are in the limelight. Generally, cholesteric liquid crystals can be obtained by a adding a chiral agent to the nematic liquid crystals are used. By adding the chiral agent, the cholesteric liquid crystals form a cyclic helical structure, cause a cyclic change of a refractive index, and effectively reflect light of specific wavelengths by Bragg reflection. This state is called a planer state, and by changing the amount of the chiral agent to be added, a wavelength for selective reflection can be freely changed to display blue, green, or red.

By injecting a cholesteric liquid crystal between a pair of transparent substrates each having a transparent electrode formed thereon, the planer state is obtained and the cell appears colored, reflecting light of specific wavelengths. The planer state is one of stable states of the cholesteric liquid crystal and can last even if no electric field is applied.

When a sufficiently high voltage is applied between the upper and lower electrodes in the state, the helical structure of the cholesteric liquid crystal disappears, and if the cholesteric liquid crystal has positive dielectric anisotropy, the liquid crystal molecules are arranged in a direction perpendicular to the substrate, that is, the direction of an electric field, and a cyclic change of refractive indexes disappears. This state is called a homeotropic state. In this case, selective reflection does not occur and the cholesteric liquid crystal goes into a transparent state in which all incident light is transmitted. Therefore, black color is appeared by forming a light absorption layer on the back of a substrate opposite to the outside light incidence side.

When an intermediate voltage is applied between the upper and lower electrodes in the state, the cholesteric liquid crystal goes into a state in which the helical axis is parallel to the substrate. This state is called a focal conic state. In this case, selective reflection does not occur, and the cholesteric liquid crystal goes into a state in which incident light is reflected only a little, or if the cell gap is small, into a transparent state in which all incident light is transmitted. The focal conic state is the another stable state of the cholesteric liquid crystal and can last even if no electric field is applied.

However, cholesteric liquid crystals change slowly in state; for example, transition from the homeotropic state to the planer state requires about one second. Accordingly, the cholesteric liquid crystals are unsuitable for display devices for which fast rewriting is required, such as when displaying moving images.

On the other hand, as a sort of liquid crystals, ferroelectric liquid crystals or ferroelectric smectic-C* liquid crystals are available, and as display devices using them, SSFLC (Surface Stabilized Ferroelectric Liquid Crystal) display devices as described in Japanese Published Unexamined Patent Application No. Hei 5-241527 and a literature "SID 94 DIGEST p845–847" are known.

The SSFLC display devices, which have a ferroelectric liquid crystal sandwiched between a pair of transparent electrodes and have two polarizer films orthogonal to each other disposed at both ends of the ferroelectric liquid crystal, can change light permeability and switch between a light transmission state and a shading state by inverting voltages applied between the transparent electrodes.

As other devices using ferroelectric liquid crystals, optical switch devices such as DHF (helical structure variable distortion type) and TMS (transient light scattering type) are known.

Ferroelectric liquid crystals, which have spontaneous polarization, can fast switch the orientation of the molecules.

However, the above-described SSFLC display devices, which use backlight and polarizer films to display images, have the problem that, although they enable fast switching between a light transmission state and a shading state, like transmission liquid crystal display devices such as conventional TN-type TFT liquid crystal displays, they have poor images in bright places and consume much electric power. This is also true for DHF and TMS optical switch devices.

SUMMARY OF THE INVENTION

Accordingly, the present invention provides a light modulator that can provide bright and contrasty reflective displays or optical switchings without using polarizer films, and enables fast display switching and optical switching.

A light modulator of the present invention has: a light modulation element and a driving circuit that drives it, wherein the light modulation element has a ferroelectric liquid crystal filled between a pair of substrates at least one of which is transparent, and is provided with a pair of electrodes for applying electric fields to the ferroelectric liquid crystal, the ferroelectric liquid crystal selectively reflecting light of specific wavelengths in a visible region due to a planer state in which helical axes are perpendicular to or almost perpendicular to the substrates, and wherein the driving circuit drives the light modulation element, at least, by a driving mode of changing the ferroelectric liquid crystal to a selective reflection state due to the planer state and a transparent state due to a homeotropic state in which a helical structure disappears.

The driving circuit may drive the light modulation element by the driving mode and another driving mode of selectively changing the ferroelectric liquid crystal to the selective reflection state due to the planer state and the transparent state due to a focal conic state in which the helical axes are parallel to or almost parallel to the substrates.

A light modulator of the present invention is configured as described above, taking advantage of the selective reflection of ferroelectric liquid crystals. According to the light modulator of the present invention, a bright, and contrasty reflective display or optical switching can be performed without using polarizer films, while display switching and optical switching can be performed fast, so that the display device can display moving images.

BRIEF DESCRIPTION OF THE DRAWINGS

Preferred embodiments of the present invention will be described in detail based on the followings, wherein.

DESCRIPTION OF THE PREFERRED EMBODIMENTS

Before describing the preferred embodiments according to the present invention, characteristics of the ferroelectric liquid crystal are explained.

Figure 12A:
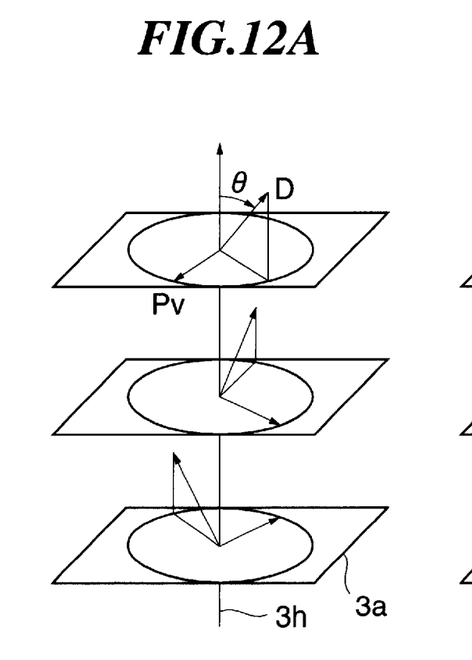
FIGS. 12A and 12B are diagrams used for explanation of ferroelectric liquid crystals.

A ferroelectric liquid crystal has asymmetric carbon within a molecule, forms a layer structure as shown in FIG. 12A, and forms a helical structure as a whole. Although the ferroelectric liquid crystal is different from a cholesteric liquid crystal in that molecules are inclined with respect to the layers, a tilt angle θ to the normal of a layer $3a$ is constant and the azimuth angle of director D changes gradually with advance along the normal.

When such a helical structure is formed in a state (referred to as a planer state) in which a helical axis $3h$ is perpendicular to or almost perpendicular to the substrate, the ferroelectric liquid crystal causes a cyclic change of refractive index and reflects light of specific wavelengths corresponding to helical pitch by Bragg reflection. This is called selective reflection like in a cholesteric liquid crystal. The selective reflection state is energetically stable and is held stable unless an external field is applied.

The ferroelectric liquid crystal has spontaneous polarization as described above and its polarization vector Pv exists within a layer surface, as shown in FIG. 12A. Furthermore, the director D and the polarization vector Pv are orthogonal to each other.

Figure 12B:
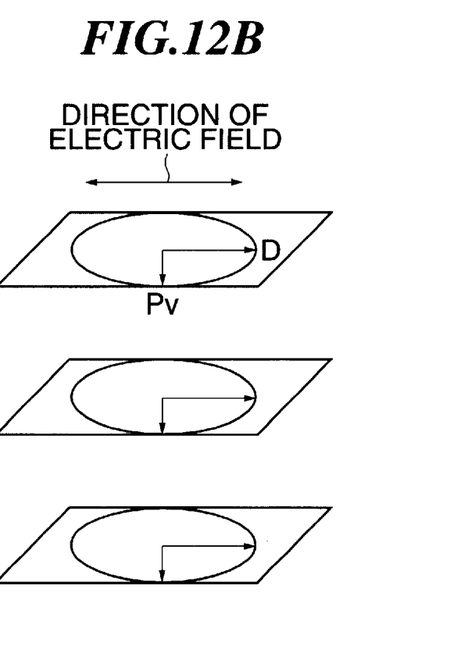

When a helical structure is thus formed and an electric field equal to or greater than a threshold value is applied in a direction perpendicular to or almost perpendicular to a helical axis $3h$ to a ferroelectric liquid crystal in a planer state in which the helical axis $3h$ is perpendicular to or almost perpendicular to the substrate, since liquid crystal molecules have spontaneous polarization, intense interactions occur between the electric field and the liquid crystal molecules, the helical structure changes, and finally the helical structure disappears as shown in FIG. 12B and all the liquid crystal molecules are oriented to the direction of the electric field. This state is called a homeotropic state.

A response time at this time τ is represented as $$\tau = \gamma/(K \times q^{2} + Ps \times E) \ldots \quad (1)$$

where γ is the rotation viscosity of the ferroelectric liquid crystal, K is an elastic constant, p is a helical pitch, Ps is the magnitude of spontaneous polarization, and E is the intensity of the applied electric field (see "FUNDAMENTAL OF LIQUID CRYSTAL AND DISPLAY," CORONA PUBLISHING CO., LTD.). q is a wave number given by $q=2\pi/p$.

As is apparent from the expression (1), a response time τ becomes shorter for a higher electric field intensity and a greater spontaneous polarization.

That is, ferroelectric liquid crystals, in comparison with cholesteric liquid crystals not having spontaneous polarization, are remarkably fast in response speed and enable fast switching.

In the homeotropic state in which a helical structure disappears and liquid crystal molecules are arranged in the direction of an electric field, as shown in FIG. 12B, ferroelectric liquid crystals go into the transparent state. When an applied electric field is zeroed in this state, the ferroelectric liquid crystals go into the selective reflection state due to the planer state as shown in FIG. 12A. Also in this case, a response time is remarkably short and the ferroelectric liquid crystals enable fast switching from the transparent state to the selective reflection state.

When a helical structure as shown in FIG. 12A is formed and an electric field equal to or greater than a threshold value is applied in a direction parallel to or almost parallel to the helical axis $3h$ to a ferroelectric liquid crystal in the planer state in which the helical axis $3h$ is perpendicular to or almost perpendicular to the substrate, the helical structure disappears and liquid crystal molecules are arranged in the direction of the electric field, as occurs when an electric field is applied in a direction perpendicular to or almost perpendicular to the above-described helical axis $3h$. That is, the ferroelectric liquid crystal goes into the homeotropic state.

FIRST EMBODIMENT

FIGS. 1 to 6

In a first embodiment, an electric field is applied in a direction perpendicular to or almost perpendicular to the helical axis of a ferroelectric liquid crystal in a planer state.

FIRST EXAMPLE

Figure 1A:
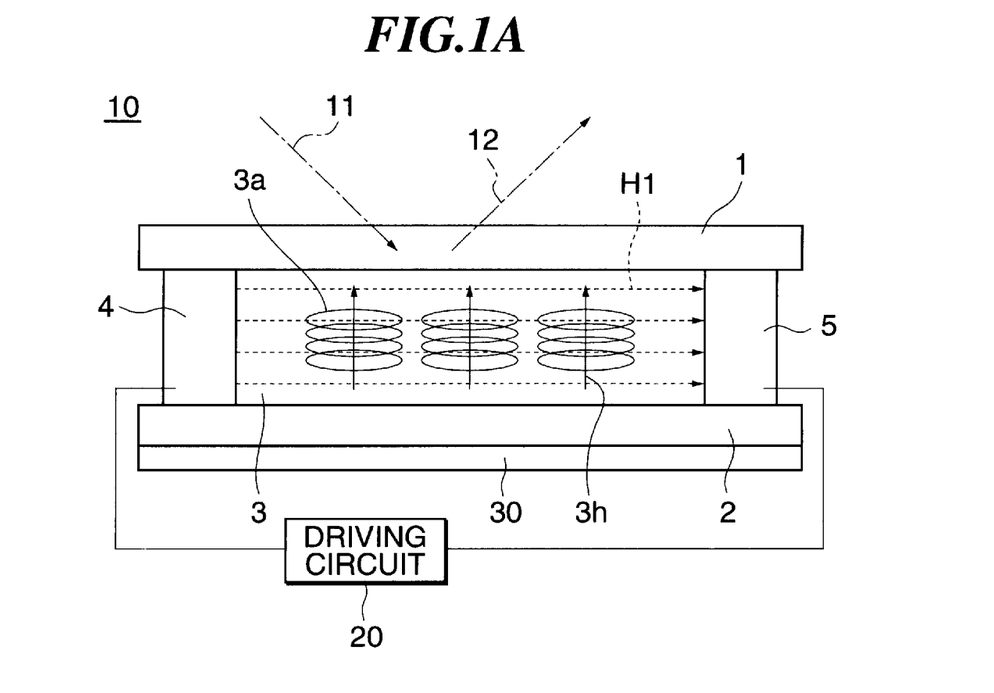
FIGS. 1A and 1B are diagrams showing a first example of a first embodiment.
Figure 1B:
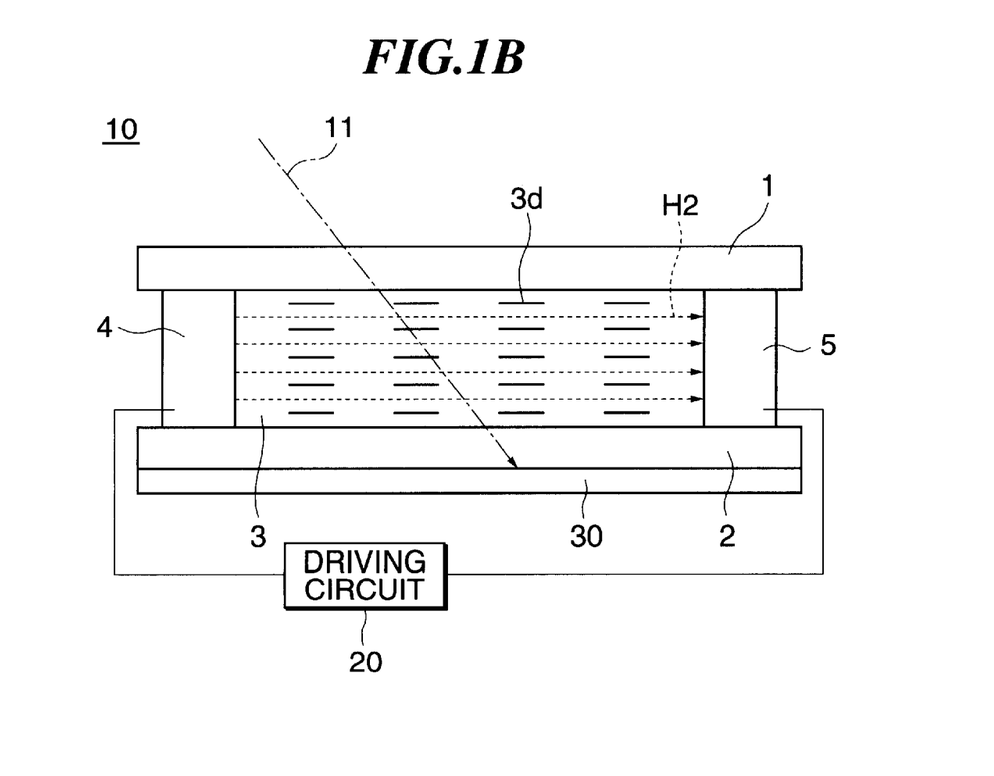

FIG. 1

FIG. 1 shows a first example of the first embodiment.

A display device has a display element 10 and a driving circuit 20. The display element 10, in this example, has a ferroelectric liquid crystal 3 sandwiched between substrates 1 and 2, has electrodes 4 and 5 formed face to face with each other in a direction parallel to the substrates at the sides of pixels, the electrodes each interposed between the substrates 1 and 2, and has a light absorption layer (black) 30 formed on the back of the substrate 2 opposite to an observation side (a side through which outside light comes).

The substrates 1 and 2 are made of glass, plastic, or the like, wherein the substrate 1 at least at the observation side is transparent. The electrodes 4 and 5 can be made of a metal such as tantalum and chrome, and can also serve as spacers to control the gap between the substrates 1 and 2.

The ferroelectric liquid crystal 3, when no electric field is applied to it, goes into a planer state as shown in FIG. 1A, in which light of specific wavelengths in a visible region in incident light 11 such as sunlight is selectively reflected as selectively reflected light 12.

Helical axes $3h$ are not perpendicular to the substrates but may be tilted in a range up to about 20° with respect to a direction perpendicular to the substrates. The directions and angles of the tilt may be dispersed within the above range, in which case the helical axes may be oriented to a given direction as a whole (in average). If all the helical axes $3h$ are oriented to a given direction, since viewing angle become narrower, it is desirable that the directions and angles of the tilt of the helical axes $3h$ are dispersed to some extent to widen viewing angle.

The driving circuit 20 applies an electric field between the electrodes 4 and 5 in a direction perpendicular to or almost perpendicular to the helical axes $3h$ of the ferroelectric liquid crystal 3, that is, in a direction parallel to or almost parallel to the substrates.

When an electric field H2 equal to or greater than a threshold value is applied in a direction perpendicular to or almost perpendicular to the helical axes $3h$, the ferroelectric liquid crystal 3 changes from a planer state due to a low electric field H1 as shown in FIG. 1A to a homeotropic state in which a helical structure disappears as shown in FIG. 1B, going into a transparent state in which all incident light 11 is transmitted, wherein, in the homeotropic state, a cyclic change of refractive indexes to cause selective reflection disappears, and liquid crystal molecules $3d$ are arranged in the direction of the electric field H2.

In this case, transition from the planer state to the homeotropic state, that is, a change from the selective reflection state to the transparent state is made faster than that of cholesteric liquid crystals due to the interactions between spontaneous polarizations and electric field applied. At this time, incident light 11 is absorbed by the light absorption layer 30, so that black is displayed.

Although, when the electric field H2 equal to or greater than the threshold value is applied, the ferroelectric liquid crystal 3 maintains the transparent state due to the homeotropic state, upon change of an applied electric field to the low electric field H1, it returns to the previous planer state and selectively reflects light of the same wavelength as previous ones. In this case, transition from the homeotropic state to the planer state, that is, a change from the transparent state to the selective reflection state is made fast by the cholesteric liquid crystals by the interactions between spontaneous polarizations.

The driving circuit 20 thus changes electric fields applied between the electrodes 4 and 5 between the low electric field H1 and the electric field H2 equal to or greater than a threshold value to change the ferroelectric liquid crystal 3 between the selective reflection state due to the planer state and the transparent state due to the homeotropic state, thereby switching between display of specific colors and display of black.

The driving mode of changing the ferroelectric liquid crystal 3 to the planer state and the homeotropic state will be hereinafter referred to as a fast driving mode. The fast driving mode allows fast switching between the selective reflection state and the transparent state as described above.

Furthermore, as shown in FIG. 1B, by decreasing applied electric fields in stages after applying the electric field H2 equal to or greater than the threshold value, the ferroelectric liquid crystal 3 can be changed to a state (referred to as a focal conic state) in which the helical axes $3h$ are parallel to or almost parallel to the substrates. In the focal conic state, although selective reflection does not occur and the ferroelectric liquid crystal 3 scatters the incident light 11, the light is scattered only a little because of the narrow gap of about 5 μm between the substrates 1 and 2, the ferroelectric liquid crystal 3 itself appears transparent, and the light absorption layer 30 is displayed in black. Yet, the focal conic state is stable and capable of memory like the planer state, so that the ferroelectric liquid crystal 3 is held transparent even if an electric field is removed.

However, the ferroelectric liquid crystal 3 must be temporarily driven into the homeotropic state before transition from the planer state to the focal conic state, and also temporarily into the homeotropic state before transition from the focal conic state to the planer state. Therefore, switching of the ferroelectric liquid crystal 3 between the planer state and the focal conic state takes a longer time than between the planer state and the homeotropic state.

Accordingly, in this example, the driving circuit 20 is configured to drive the display element 10 by the fast driving mode and a driving mode (hereinafter referred to as a slow driving mode) of selectively changing the ferroelectric liquid crystal 3 to the planer state and the focal conic state.

According to this configuration, when static images are to be displayed or saved, the driving circuit 20 drives the display element 10 so as to change the ferroelectric liquid crystal 3 to the planer state and the focal conic state by the slow driving mode, whereby the static images can be displayed in the display element 10 by dint of the memory capability of the planer state and the focal conic state, or images can be saved without using power.

In the display element of this example, since the electrodes 4 and 5 of the display element 10 are not transparent electrodes on a pixel surface such as ITO electrodes but are opposed to each other in the direction of pixel surface in the sides of pixels, the influence of reflection by the electrodes can be reduced and contrast and color purity can be improved.

Although drawings are omitted, like examples of FIGS. 4 and 6 on second and third examples shown in FIGS. 2 and 5, described later, if three-layer display elements selectively reflecting blue, green, and red lights respectively in the selective reflection state due to the planer state of the ferroelectric liquid crystal 3 are stacked to construct a display device capable of displaying multiple colors, particularly contrast is highly improved and the contrast between white and black can be sufficiently obtained.

Since the electrodes 4 and 5 can be made of a metal such as tantalum and chrome, they can, even though wires are thin, have lower resistance than ITO electrodes.

SECOND EXAMPLE

Figure 2:
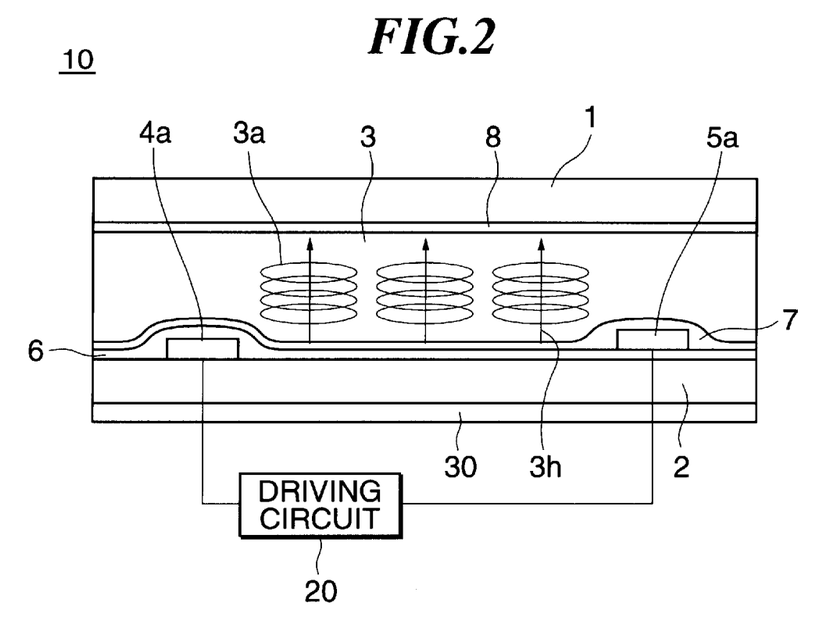
FIG. 2 is a diagram showing a second example of the first embodiment.
Figure 3:
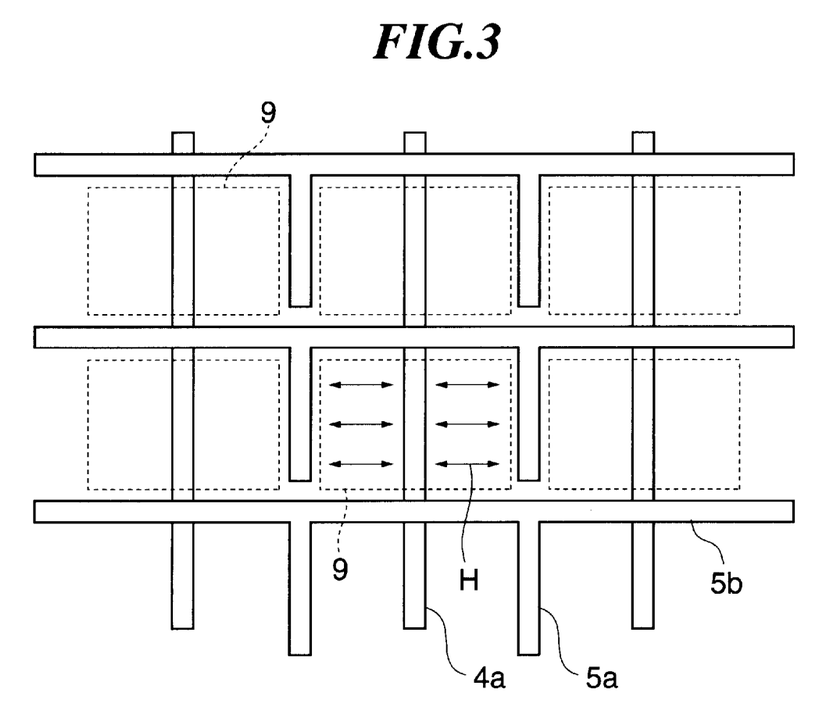
FIG. 3 is a diagram showing the second example.
Figure 4:
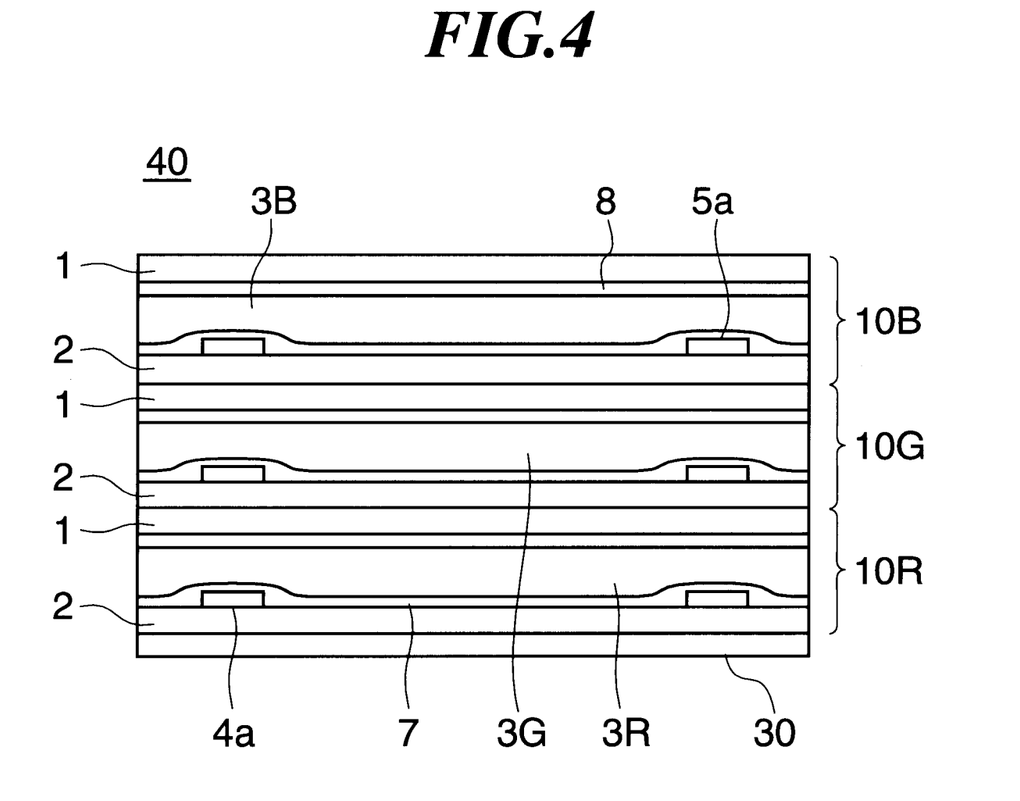
FIG. 4 is a diagram showing a multiple-color display device used in the second example.

FIGS. 2 to 4

FIG. 2 shows a second example of the first embodiment.

In a display device of this example, on one substrate 2, a signal electrode 4a and a scanning electrode 5a are formed face to face with each other in a direction parallel to the substrate, and by the driving circuit 20, an electric field is applied between the electrodes 4a and 5a in a direction perpendicular to or almost perpendicular to the helical axes 3h of the ferroelectric liquid crystal 3.

Referring to FIG. 3 also, a display element of this example is described along with an example of a manufacturing method.

First, the substrate 2 is cleaned, a tantalum film 100 nm thick is produced on one surface thereof by RF sputtering, and patterning is performed in stripe shape 10 μm wide by a photolithography process to form the signal electrode 4a.

Next, amorphous SiN 300 nm thick is formed on the substrate 2 containing the signal electrode 4a by plasma CVD to form an insulating layer 6.

Next, a tantalum film 100 nm thick is produced on the insulating layer 6 by RF sputtering, and patterning is performed in stripe shape 10 μm wide by a photolithography process to form a scanning electrode 5a and a wiring pattern 5b thereof. The wiring pattern 5b is formed in a direction orthogonal to the signal electrode 4a.

Next, a polyimide film 50 nm thick is produced on the substrate 2 to form orientation films 7, and then spherical spacers 5 μm in diameter are dispersed. Moreover, a polyimide film 50 nm thick is produced on another substrate 1 to form an orientation film 8, and then the substrates 1 and 2 are opposed to each other to form a cell.

Next, after the ferroelectric liquid crystal 3 is vacuum-injected into the cell, the helical axes of the ferroelectric liquid crystal 3 are arranged by shear stress or annealing in a direction perpendicular to or almost perpendicular to the substrates to complete the display element 10.

As shown in FIG. 3, the display element of this example can, in a selected pixel 9, be matrix-driven by applying electric fields H between the signal electrode 4a and scanning electrodes 5a sandwiching the signal electrode 4a.

FIG. 4 shows an example of a display device capable of displaying multiple colors, which has three-layer display elements 10B, 10G, and 10R stacked on top of each other, and has the black light absorption layer 30 formed on the back of the display element 10R that is the farthest from an outside light input side, wherein the display elements are those used in the example of FIG. 2 and respectively employ ferroelectric liquid crystals 3B, 3G, and 3R selectively reflecting blue, green, and red lights in the selective reflection state due to the planer state.

Since the display device of this example, as described in the example of FIG. 1, has no transparent electrodes on pixel surfaces such as ITO electrodes, the influence of reflection by electrodes can be reduced and particularly the contrast between white and black can be sufficiently obtained.

THIRD EXAMPLE

Figure 5:
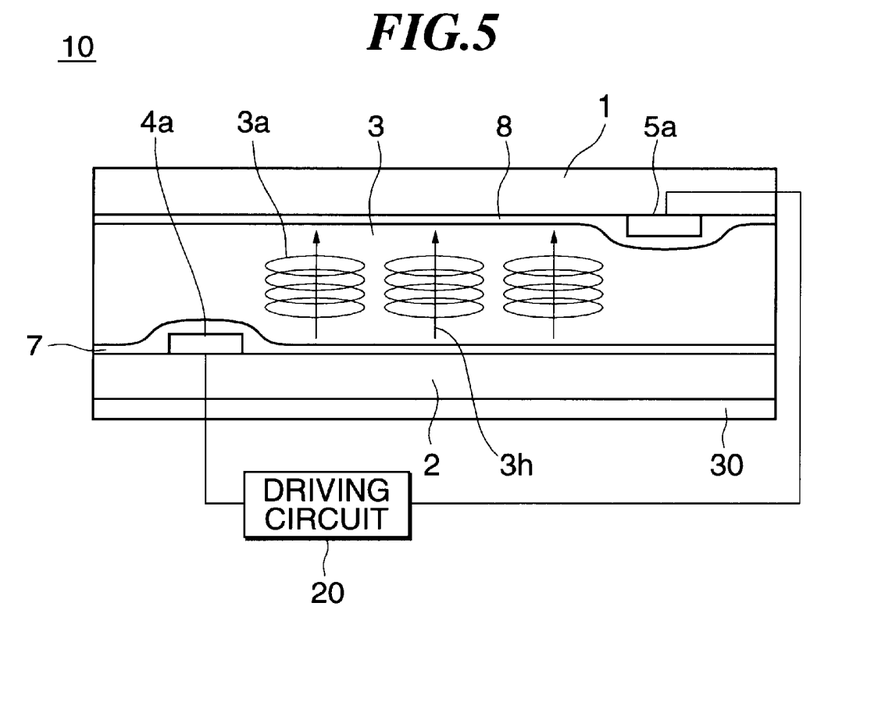
FIG. 5 is a diagram showing a third example of the first embodiment.
Figure 6:
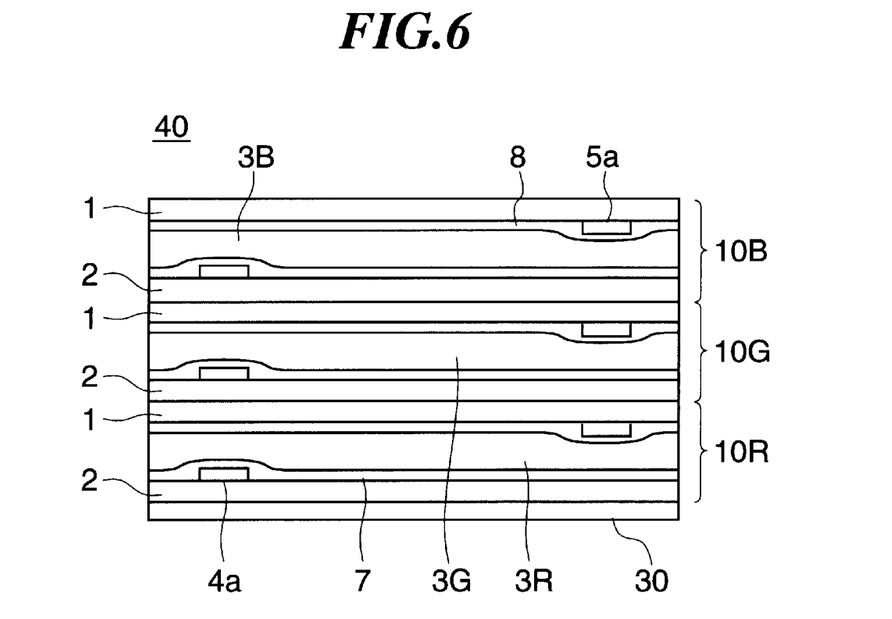
FIG. 6 is a diagram showing a multiple-color display device used in the third example.

FIGS. 5 to 6

FIG. 5 shows a third example of the first embodiment.

In a display element of this example, the signal electrode 4a on one substrate 2 and the signal electrode 5a on another substrate 1 are formed face to face with each other in a direction almost parallel to the substrates, and electric fields are applied by the driving circuit 20 between the electrodes 4a and 5a in a direction perpendicular to or almost perpendicular to the helical axes 3h of the ferroelectric liquid crystal 3 in the planer state.

Although, also in this example, alignment layers 7 and 8 are formed on the substrates 2 and 1, respectively, the insulating layer 6, as shown in FIG. 2, for insulating the signal electrode 4a and the scanning electrode 5a is unnecessary.

In this example, to be exact, the electrodes 4a and 5a are opposed in a direction oblique to the substrates, and the direction of electric fields is also oblique to the substrates. However, this does not actually matter because the gap between the substrates 1 and 2 is no more than about 5 μm for the pixel pitch of about 50 μm.

In the example of FIG. 2, electric flux lines bend in the neighborhood of the electrodes 4a and 5a, while, in the example of FIG. 5, electric flux lines become linear even in the neighborhood of the electrodes 4a and 5a. Therefore, in the example of FIG. 5, a transparent state is obtained more stably than in the example of FIG. 2.

FIG. 6 shows an example of a display device capable of displaying multiple colors, which has three-layer display elements 10B, 10G, and 10R stacked on top of each other, and has the black light absorption layer 30 formed on the back of the display element 10R that is the farthest from an outside light input side, wherein the display elements are those used in the example of FIG. 5 and respectively employ ferroelectric liquid crystals 3B, 3G, and 3R selectively reflecting blue, green, and red lights in the selective reflection state due to the planer state.

Since the display device of this example, like the display device of the example of FIG. 4, has no transparent electrodes on pixel surfaces such as ITO electrodes, the influence of reflection by the electrodes can be reduced and particularly the enough contrast ratio between white and black can be obtained.

SECOND EMBODIMENT

Figure 7:
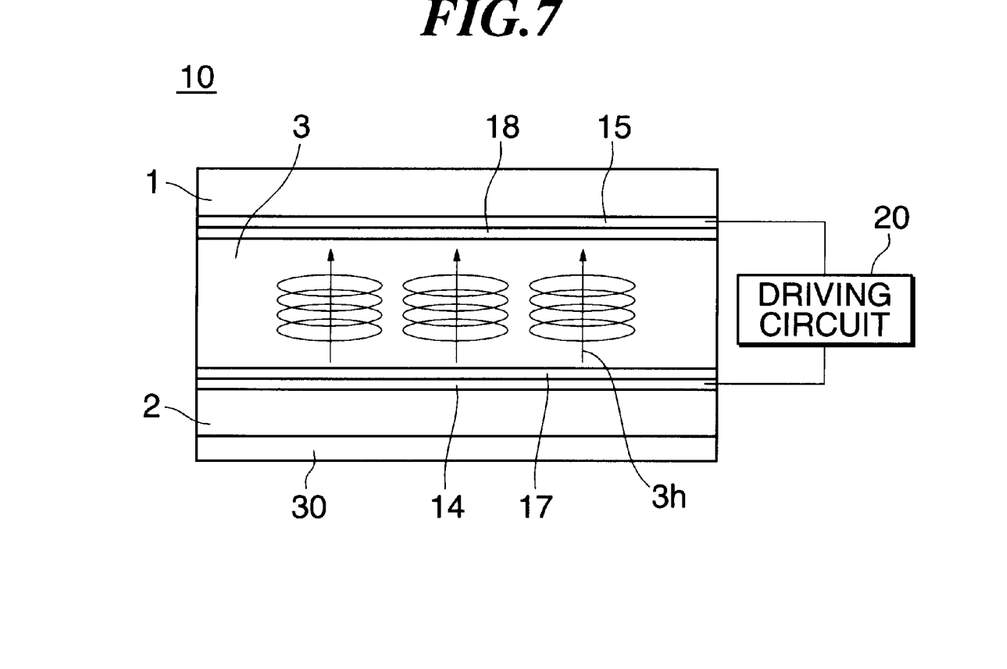
FIG. 7 is a diagram showing a second embodiment.
Figure 8:
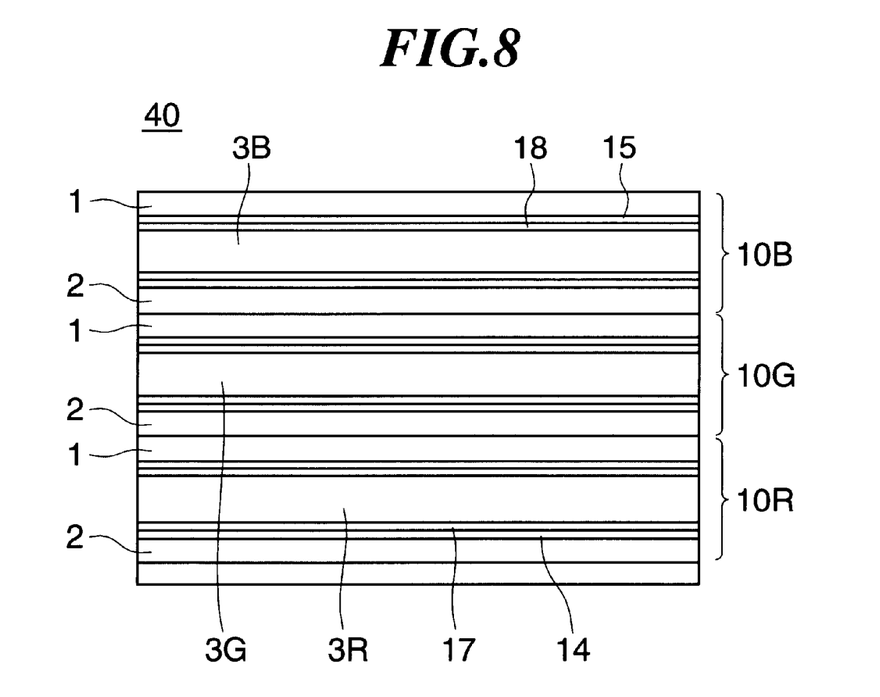
FIG. 8 is a diagram showing a multiple-color display device used in the second embodiment.

FIGS. 7 and 8

Although, in the above-described first embodiment, electric fields are applied in a direction perpendicular to or almost perpendicular to the helical axes of the ferroelectric liquid crystal in the planer state, electric fields may be applied in a direction parallel to or almost parallel to the helical axes of the ferroelectric liquid crystal in the planer state.

FIG. 7 shows an embodiment in this case. In this embodiment, the display element 10 has electrodes 15 and 14 and alignment layers 18 and 17 formed on one side of the substrates 1 and 2, respectively, and has the light absorption layer 30 formed on the back of the substrate 2 opposite to the observation side, wherein the substrates 1 and 2 are opposed to each other with the electrodes 15 and 14 facing inside, and the ferroelectric liquid crystal 3 is sandwiched between the substrates 1 and 2.

At least the substrate 1 of the observation side is a transparent substrate and at least the electrode 15 of the observation side is also a transparent electrode such as an ITO electrode.

Like the examples of FIGS. 1, 2, and 5, the ferroelectric liquid crystal 3, when no electric field is applied to it, goes into the planer state in which the helical axes 3$h$ become perpendicular to or almost perpendicular to the substrates, selectively reflecting light of specific wavelengths in a visible region.

The driving circuit 20 applies an electric field in a direction parallel to or almost parallel to the helical axis 3$h$ of the ferroelectric liquid crystal 3 in the planer state between the electrodes 15 and 14, that is, in a direction perpendicular to the substrates.

When an electric field equal to or greater than a threshold value is applied in a direction perpendicular to the substrates, the ferroelectric liquid crystal 3 changes from a planer state caused by a low electric field as shown in FIG. 7 to a homeotropic state in which a helical structure disappears, going into a transparent state, wherein, in the homeotropic state, a cyclic change of refractive index to cause selective reflection disappears and liquid crystal molecules are arranged in the direction of the electric field.

In this case, transition from the planer state to the homeotropic state, that is, a change from the selective reflection state to the transparent state is made fast by cholesteric liquid crystals by the interactions between spontaneous polarizations. At this time, incident light is absorbed by the light absorption layer 30, so that black is displayed.

Although, when an electric field equal to or greater than the threshold value is applied, the ferroelectric liquid crystal 3 maintains the transparent state due to the homeotropic state, upon change of an applied field to the low electric field, it returns to the previous planer state and selectively reflects light of the same wavelengths as previous ones. In this case, transition from the homeotropic state to the planer state, that is, a change from the transparent state to the selective reflection state is made fast by the interactions between spontaneous polarizations.

Furthermore, as shown in FIG. 1B, by decreasing applied electric fields in stages after applying an electric field H2 equal to or greater than the threshold value, the ferroelectric liquid crystal 3 can be changed to the focal conic state in which the helical axes 3$h$ are parallel to or almost parallel to the substrates. In the focal conic state, although selective reflection does not occur and the ferroelectric liquid crystal 3 scatters the incident light 11, the light is scattered only a little because of the narrow gap of about 5 $\mu$m between the substrates 1 and 2, the ferroelectric liquid crystal 3 itself appears transparent, and the light absorption layer 30 is displayed in black. Yet, the focal conic state is stable and capable of memory like the planer state, so that the ferroelectric liquid crystal 3 is held transparent even if an electric field is removed.

Accordingly, in the second embodiment, as in the first embodiment, for fast switching between the selective reflection state and the transparent state, e.g., such as when displaying moving images, the driving circuit 20 drives the display element 10 by the fast driving mode of changing the ferroelectric liquid crystal 3 to the planer state and the homeotropic state, while, when displaying static images or saving images, the driving circuit 20 drives the display element 10 by the slow driving mode of changing the ferroelectric liquid crystal 3 to the planer state and the focal conic state.

FIG. 8 shows an example of a display device capable of displaying multiple colors, which has three-layer display elements 10B, 10G, and 10R stacked on top of each other, and has the light absorption layer 30 formed on the back of the display element 10R that is the farthest from the outside light input side, wherein the display elements are those used in the example of FIG. 7 and respectively employ ferroelectric liquid crystals 3B, 3G, and 3R selectively reflecting blue, green, and red lights in the selective reflection state due to the planer state.

VERIFICATION BY EXPERIMENTS

Figure 9:
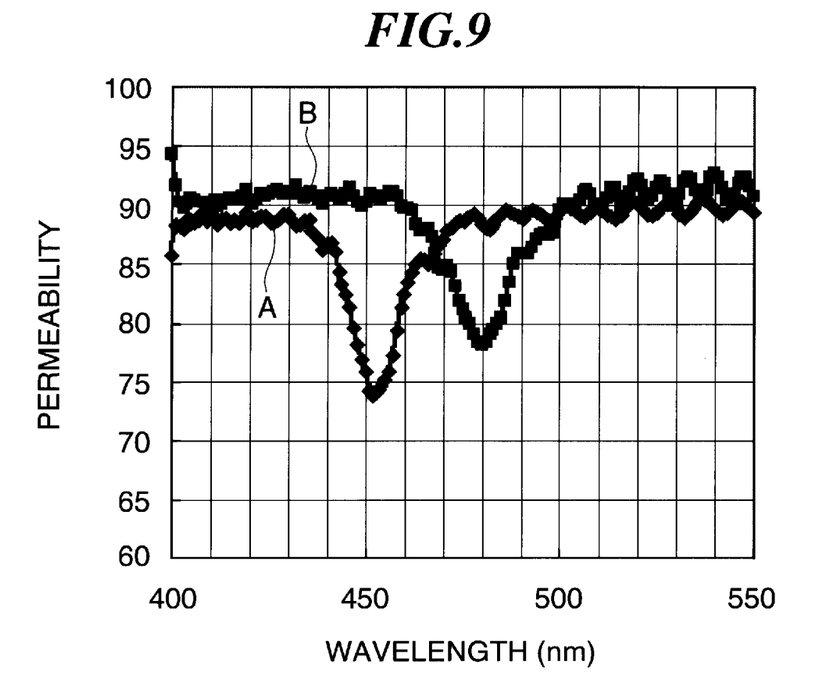
FIG. 9 is a graph showing permeability properties of two ferroelectric liquid crystals used in prototyping.
Figure 10:
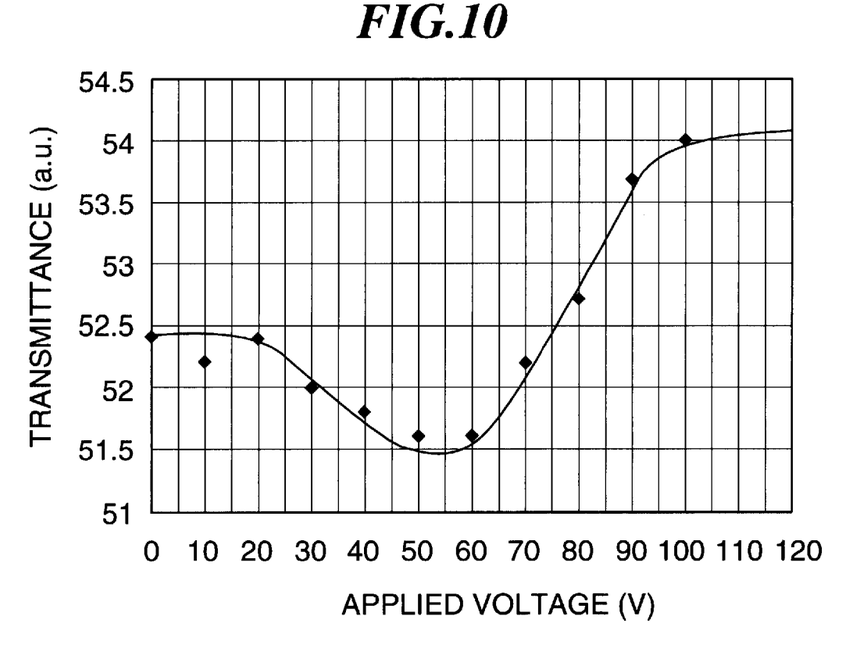
FIG. 10 is a graph showing the properties of permeability of a prototyped element to applied voltages.
Figure 11:
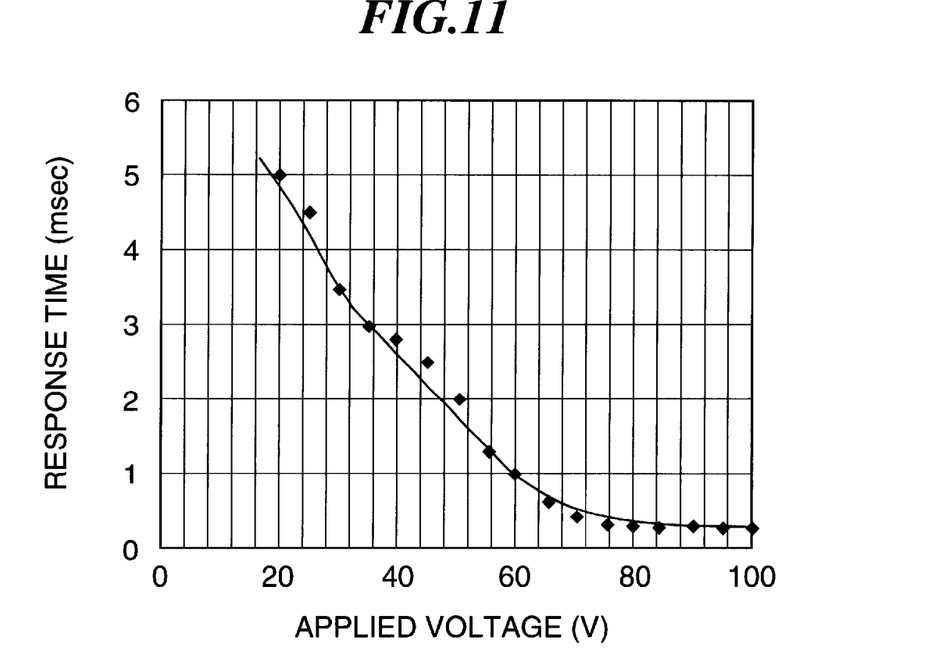
FIG. 11 is a graph showing the properties of response time of a prototyped element to applied voltages.

FIGS. 9 to 11

For the case of disposing a pair of electrodes on an identical substrate as in the example of FIG. 2, an element was prototyped to measure its properties.

A tantalum film 100 nm thick was produced by RF sputtering on a glass substrate to constitute one substrate, patterning was performed by a photolithography process, and a pair of electrodes each 20 $\mu$m wide were formed at an interval of 30 $\mu$m. Next, a polyimide film 50 nm thick was produced and dried on the glass substrate to form a vertical orientation film. A similar vertical alignmentfilm was formed on a glass substrate to constitute another substrate, spherical spacers 10 $\mu$m in diameter were dispersed, the glass substrate on which the above electrode was formed was temporarily secured to the spacers, and the substrates were stacked to each other to form an empty cell.

Next, ferroelectric liquid crystals DF-C101 and DF-C100 produced by CHISSO CORPORATION were mixed so as to cause selective reflection at wavelengths of about 500 nm in a visibleregion, wherein the DF-C101 and DF-C100 have helical pitches corresponding to ultraviolet and infrared areas, respectively, and have wavelength-permeability properties as shown in diamonds (A) and rectangles (B) in FIG. 9, respectively.

Although the mixed ferroelectric liquid crystal was injected into the above cell, since reflected light was not observed in that state, the ferroelectric liquid crystal was oriented to the planer state by shear stress to enable observation of the selective reflection. Thereafter, a voltage was applied between the above electrodes to observe a response.

FIG. 10 shows experimental results. In the experiment, cell permeability was measured by radiating light from the back of the cell and detecting the amount of light transmitted through the surface of the cell. It was confirmed that application of a voltage decreased selective reflection and increased the amount of transmitted light, that is, liquid crystals were oriented to the direction of an electric field by applying a voltage. At this time, a change in wavelengths was little observed.

FIG. 11 shows the relationship between applied voltages and response times in this case. As shown in FIG. 11, the prototyped element could turn on and off selective reflection in about 0.2 ms when a voltage of 100 V was applied.

OTHER EMBODIMENTS

Although, in the above-described embodiments, the present invention is applied to reflective display devices, the present invention can also apply to reflective optical switch apparatuses.

As has been described above, according to the present invention, bright, and contrasty reflective display or optical switching can be attained without polarizer films, and rapid display switching or optical switching can be realized.

The entire disclosure of Japanese Patent Application No. 2000-127561 filed on Apr. 27, 2000 including specification, claims, drawings and abstract is incorporated herein by reference in its entirety.

What is claimed is:

1. A light modulator comprising a light modulation element and a driving circuit that drives it, wherein the light modulation element has a ferroelectric liquid crystal filled between a pair of substrates at least one of which is transparent, and is provided with a pair of electrodes for applying electric fields to the ferroelectric liquid crystal, the ferroelectric liquid crystal selectively reflecting light of specific wavelengths in a visible region due to a planer state in which a helical axis is perpendicular to or almost perpendicular to the substrates, and wherein the driving circuit drives the light modulation element, at least, by a driving mode of changing the state of the ferroelectric liquid crystal to a selective reflection state due to the planer state and a transparent state due to a homeotropic state in which a helical structure disappears.

2. The light modulator according to claim 1, wherein the driving circuit drives the light modulation element selectively by the driving mode and another driving mode of changing the state of the ferroelectric liquid crystal to the selective reflection state due to the planer state and the transparent state due to a focal conic state in which the helical axis is parallel to or almost parallel to the substrates.

3. The light modulator according to claim 1, wherein the pair of electrodes apply electric fields to the ferroelectric liquid crystal in a direction perpendicular to or almost perpendicular to the helical axis in the planer state.

4. The light modulator according to claim 3, wherein the pair of electrodes are provided on a same substrate.

5. The light modulator according to claim 3, wherein the pair of electrodes are provided on different substrates.

6. The light modulator according to claim 3, wherein the pair of electrodes are provided at the sides of pixels.

7. The light modulator according to claim 1, wherein the pair of electrodes, at least one of which is a transparent electrode, are provided on different substrates, and apply electric fields to the ferroelectric liquid crystal in a direction parallel or almost parallel to the helical axis in the planer state.

8. A display device having three-layer display elements stacked, wherein the display elements each constitute the light modulation element set forth in claim 3 and selectively reflect blue, green, and red lights respectively in the selective reflection state due to the planer state of the ferroelectric liquid crystal.

9. A display device having three-layer display elements stacked, wherein the display elements each constitute the light modulation element set forth in claim 7 and selectively reflect blue, green, and red lights respectively in the selective reflection state due to the planer state of the ferroelectric liquid crystal.

10. A light modulation element that has a ferroelectric liquid crystal filled between a pair of substrates at least one of which is transparent, and is provided with a pair of electrodes for applying electric fields to the ferroelectric liquid crystal, wherein the ferroelectric liquid crystal selectively reflects light of specific wavelengths in a visible region due to a planer state in which a helical axis is perpendicular to or almost perpendicular to the substrates.

* * * * *